United States Patent
Solanki

(10) Patent No.: US 12,184,327 B2
(45) Date of Patent: Dec. 31, 2024

(54) OPTICAL WIRELESS COMMUNICATION SYSTEM AND ADAPTIVE OPTICAL WIRELESS COMMUNICATION NETWORK

(71) Applicant: VELMENNI OU, Tartu (EE)

(72) Inventor: Deepak Solanki, New Delhi (IN)

(73) Assignee: VELMENNI OU

( * ) Notice: Subject to any disclaimer, the term of this patent is extended or adjusted under 35 U.S.C. 154(b) by 0 days.

(21) Appl. No.: 16/620,851

(22) PCT Filed: Jun. 7, 2018

(86) PCT No.: PCT/EP2018/064947
§ 371 (c)(1),
(2) Date: Dec. 9, 2019

(87) PCT Pub. No.: WO2018/224575
PCT Pub. Date: Dec. 13, 2018

(65) Prior Publication Data
US 2020/0195343 A1    Jun. 18, 2020

(30) Foreign Application Priority Data
Jun. 9, 2017   (GB) .................................... 1709229

(51) Int. Cl.
*H04B 10/11*    (2013.01)
*H04B 10/114*    (2013.01)
(Continued)

(52) U.S. Cl.
CPC ....... *H04B 10/116* (2013.01); *H04B 10/1143* (2013.01); *H04B 10/1149* (2013.01);
(Continued)

(58) Field of Classification Search
None
See application file for complete search history.

(56) References Cited

U.S. PATENT DOCUMENTS

| 7,688,680 B1 * | 3/2010 | Gunasekara | ........... H04B 11/00 367/134 |
| 8,503,886 B1 * | 8/2013 | Gunasekara | ......... H04B 10/116 398/118 |

(Continued)

FOREIGN PATENT DOCUMENTS

| CN | 102710329 A | 3/2012 |
| CN | 203675114 U | 6/2014 |

(Continued)

OTHER PUBLICATIONS

Search Report under Section 17(5) on GB1709229.7 mailed on Nov. 29, 2017 (5 pages).

(Continued)

*Primary Examiner* — Steven Hieu D Nguyen
(74) *Attorney, Agent, or Firm* — Jose Cherson Weissbrot

(57) ABSTRACT

A communication system is provided, comprising a network members, each one comprising a first communication interface adapted to communicatively couple to any other one of the of said network members and a user device via optical wireless communication (OWC); a gateway member, comprising a second communication interface adapted to communicatively couple to any one of said network members via optical wireless communication (OWC), said a second communication interface is further adapted to communicatively couple to a external communication network; a portable access member, removably connectable to a user device and comprising a third communication interface adapted to communicatively couple said user device to any one of said network members via optical wireless communication (OWC), and wherein said communication system is adapted to form any one of a duplex ring network topology and a duplex mesh network topology, utilizing said network members and said a gateway member.

13 Claims, 21 Drawing Sheets

(51) Int. Cl.
  *H04B 10/116*  (2013.01)
  *H04W 84/18*  (2009.01)
  *H04W 88/06*  (2009.01)
  *H04W 88/16*  (2009.01)

(52) U.S. Cl.
  CPC .......... *H04W 84/18* (2013.01); *H04W 88/06* (2013.01); *H04W 88/16* (2013.01)

(56) References Cited

U.S. PATENT DOCUMENTS

| | | | |
|---|---|---|---|
| 2002/0054593 A1* | 5/2002 | Morohashi | H04W 92/20 370/386 |
| 2008/0304831 A1 | 12/2008 | Miller et al. | |
| 2010/0080566 A1 | 4/2010 | Hunt | |
| 2011/0164878 A1* | 7/2011 | Ma | H04W 88/085 398/115 |
| 2011/0188484 A1* | 8/2011 | Reznik | H04W 16/10 370/338 |
| 2012/0001567 A1* | 1/2012 | Knapp | H04L 12/6418 315/291 |
| 2012/0027409 A1 | 2/2012 | Agrawal et al. | |
| 2013/0010675 A1 | 1/2013 | Huen et al. | |
| 2015/0126200 A1* | 5/2015 | Wang | H04W 36/0072 455/438 |
| 2015/0280823 A1 | 10/2015 | Breuer et al. | |
| 2016/0218804 A1* | 7/2016 | Raj | H04B 10/40 |
| 2016/0323975 A1* | 11/2016 | White | H05B 47/195 |
| 2016/0352422 A1* | 12/2016 | Yue | H04B 10/116 |
| 2017/0041072 A1* | 2/2017 | Rong | H04B 10/116 |
| 2019/0363791 A1* | 11/2019 | Teo | H04B 10/1149 |
| 2020/0044735 A1* | 2/2020 | Wang | H05B 47/125 |

FOREIGN PATENT DOCUMENTS

| | | |
|---|---|---|
| EP | 2 924 892 A1 | 9/2015 |
| WO | WO-2017/125747 A1 | 7/2017 |
| WO | WO-2017/149320 A1 | 9/2017 |

OTHER PUBLICATIONS

International Search Report and Written Opinion, PCT/EP2018/064947, Velmenni Ou, 13 pages (Sep. 12, 2018).
International Preliminary Report on Patentability on PCT/EP2018/064947, mailed on Dec. 19, 2019 (9 pages).
Singapore Search Report and Written Opinion on Singapore appln No. 11201911856Y dated Mar. 30, 2021 (8 pages).

* cited by examiner

OPTICAL WIRELESS COMMUNICATION SYSTEM AND ADAPTIVE OPTICAL WIRELESS COMMUNICATION NETWORK

CROSS-REFERENCE TO RELATED APPLICATIONS

This is a U.S. National Stage Patent Application, under 35 U.S.C. 371, of International Patent Application No. PCT/EP2018/064947, filed on Jun. 7, 2018, which claims priority to United Kingdom Patent Application No. 1709229.7, filed on Jun. 9, 2017, the contents of both of which are incorporated herein by reference in their entireties.

The present invention generally relates to a communication systems and networks, in particular to wireless communication systems and networks, and even more particular, to optical wireless communication systems and networks, such as Visible Light Communication (VLC) systems and Li-Fi networks.

INTRODUCTION

Wireless communication (e.g. Wi-Fi) has now become a standard way of transmitting data between mobile users and mobile network providers, for example, to access internet services or communicate with other users. In recent years, considerable advances have been made in optical wireless communication (OWC) or Visible Light Communication (VLC), which uses light, for example, from LEDs to transmit data in a similar manner to Wireless local Area Network (WLAN, Wi-Fi etc.) communication.

A subset of OWC is the so called Li-Fi, which is a high-speed wireless communication technology where the LEDs are pulsed at a very high rate (i.e. not noticeable with the human eye) to transmit data. Li-Fi can be used in electromagnetic sensitive areas (e.g. aircraft, hospitals) without the disadvantages of current RF electromagnetic radiation (EMR).

Although, communication networks using Li-Fi technology are known, none of these network systems allow duplex wireless communication between network nodes, as well as, user devices. Consequently, there is a need for an adaptive Optical Wireless Network system that can be fully integrated in any public transport, such as, aircrafts, trains and busses, as well as, form part of a building infrastructure.

Accordingly, it is an object of the present invention to provide an improved optical wireless communication system that is suitable to provide a fully duplex adaptive optical wireless network.

SUMMARY OF THE INVENTION

Preferred embodiment(s) of the invention seek to overcome one or more of the disadvantages of the prior art.

According to a first embodiment of the invention, there is provided a communication system, comprising:
  a plurality of network members, each one comprising at least one first communication interface adapted to communicatively couple to any other one of said plurality of network members and at least one user device via optical wireless communication (OWC);
  at least one gateway member, comprising at least one second communication interface adapted to communicatively couple to any one of said plurality of network members via optical wireless communication (OWC), said at least one second communication interface is further adapted to communicatively couple to at least one external communication network;
  at least one portable access member, operably connectable to a user device and comprising at least one third communication interface adapted to communicatively couple said user device to any one of said plurality of network members via optical wireless communication (OWC), and
  wherein said communication system is adapted to form any one of a duplex ring network topology and a duplex mesh network topology, utilising said plurality of network members and said at least one gateway member.

Advantageously, at least a portion of said plurality of network members and said at least one gateway member may be adapted to form an optical wireless communication (OWC) backbone network of said communication system. Preferably, any one of said first communication interface, said second communication interface and said third communication interface may be adapted to provide Visible Light Communication (VLC) and Infrared Light Communication.

Advantageously, said first communication interface may comprise:
  at least one uplink transceiver element, adapted to receive data from a user device and/or any other one of said plurality of network members and transmit the data to any other one of said plurality of network members and/or said at least one gateway member, and
  at least one downlink transceiver element, adapted to receive data from any other one of said plurality of network elements and/or said at least one gateway member and transmit the data to the user device and/or any other one of said plurality of network members.

Advantageously, said uplink transceiver element may be adapted to utilise Infrared Light Communication. Even more advantageously, said downlink transceiver element may be adapted to utilise Visible Light Communication (VLC).

Advantageously, any one of said plurality of network members may further comprise a Li-Fi user access port operably coupled to said first communication interface and adapted to establish a Li-Fi communication channel with said at least one portable access member. Preferably, said Li-Fi user access port is at least one light source. Even more preferably, said at least one light source comprises at least one LED.

Advantageously, said at least one gateway member may be adapted to control any one of said plurality of network members.

Advantageously, said optical wireless communication (OWC) may be adapted to provide optical communication via electromagnetic radiation (EMR) with a wavelength in any one of the visible light spectrum, the infrared light spectrum or ultraviolet light spectrum.

Additionally, at least a predetermined portion of said plurality of network members may further comprise a fourth communication interface adapted to communicatively couple to any other one of said predetermined portion of said plurality of network members via Wireless Local Area Network (WLAN) communication and/or Local Area Network (LAN) communication.

Advantageously, said Wireless Local Area (WLAN) network is adapted to provide wireless communication via electromagnetic radiation (EMR) with a wavelength in the radio frequency spectrum.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

Figure 1:
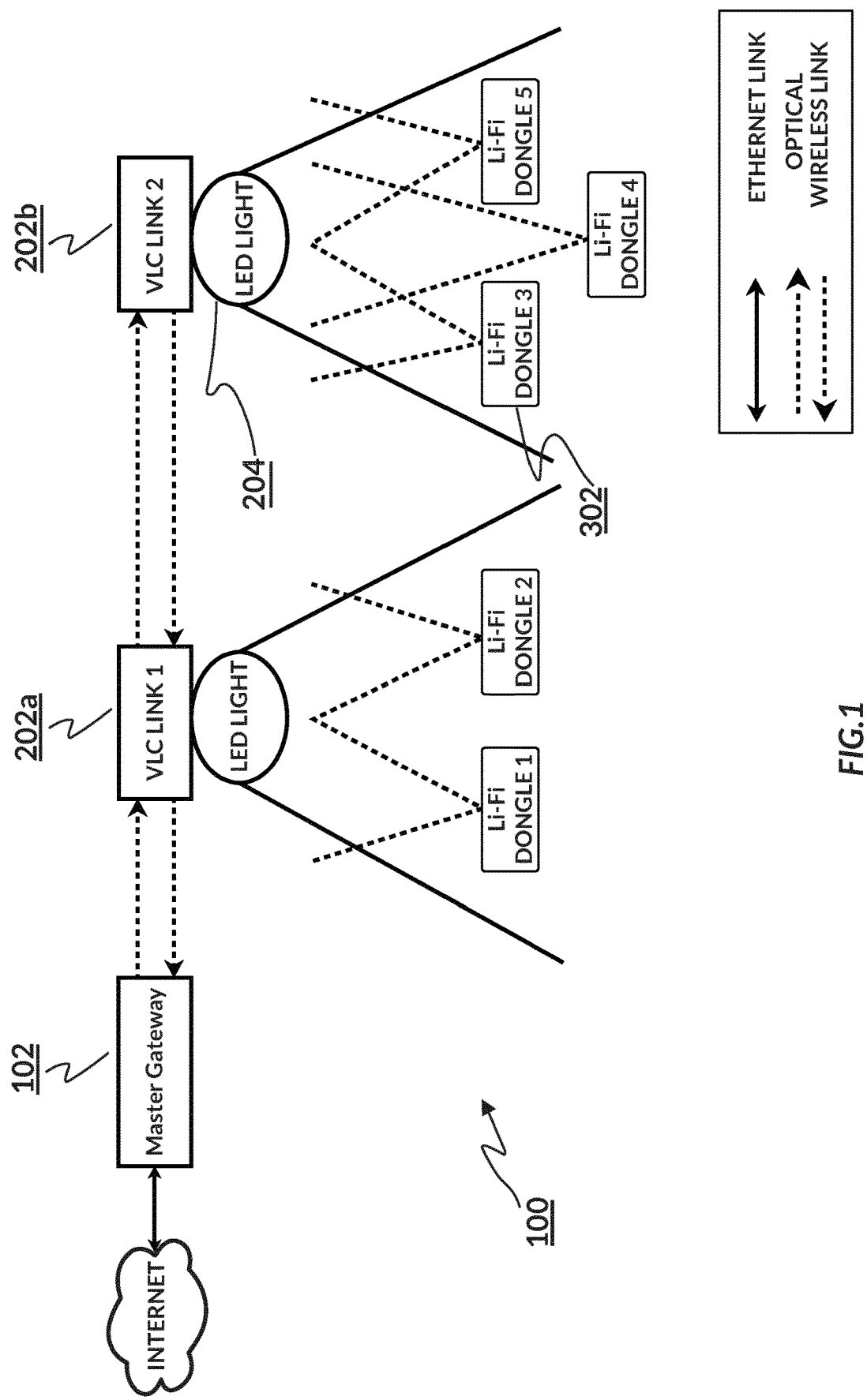
FIG. 1 shows a schematic illustration of the overall system architecture of the system of the present invention.

The exemplary embodiments of this invention will be described in relation to the media networks (In-Flight-Entertainment) implemented in public transport, such as, aircrafts and trains. However, it should be appreciated that, communication system of this invention is equally applicable to any other suitable infrastructure. The communication system 100 of the present invention makes it easier to build seamless wireless communication networks using light to transfer data. The unique network system components of the Visible Light Communication (VLC) system allows building a data transmission medium that is not affected by congested radio frequencies or interferences from electromagnetic waves. Also, various different types of network topologies can be utilised, such that devices that are equipped with, for example, specific Li-Fi dongles 302 can also access the network and exchange data at extremely high speeds. In addition, the communication system 100 of the present invention provides a highly secure data interchange.

The hardware of the communication system 100 of the present invention includes one or more master gateway members 102, a plurality of VLC network link members 202, and one or more portable user access dongles 302. The user access dongle 302 may be specifically configured for a predetermined communication standard used by the end user device. In order to make full use of Li-Fi communication in, for example, a public transport (e.g. aircraft cabin, train compartments), the master gateway member(s) 102 is preferably in the line of sight of at least one VLC network link member 202, and the Li-Fi user access port 204 of at least one of the corresponding plurality of VLC network link members 202 is preferably in line of sight of the portable user access dongle 302 connected to the user device 400. However, it is understood by the person skilled in the art, that suitable structure surface reflection may be sufficient to convey the data between the VLC network link members 202, user access ports 204 and master gateway member(s) 102, so that line of sight may not necessarily be essential.

Furthermore, when applying the communication system 100 inside a building structure 500, e.g. creating a building IT backbone, line of sight may also not be essential, if the reflection on structure surfaces is sufficient to transmit any one of the communication signals. Consequently, there is no need to run physical cables through the structure(s) to bring the data to each one of the Li-Fi mesh transceiver(s), therefore, facilitating the integration into complex industrial scenarios.

Figure 2:
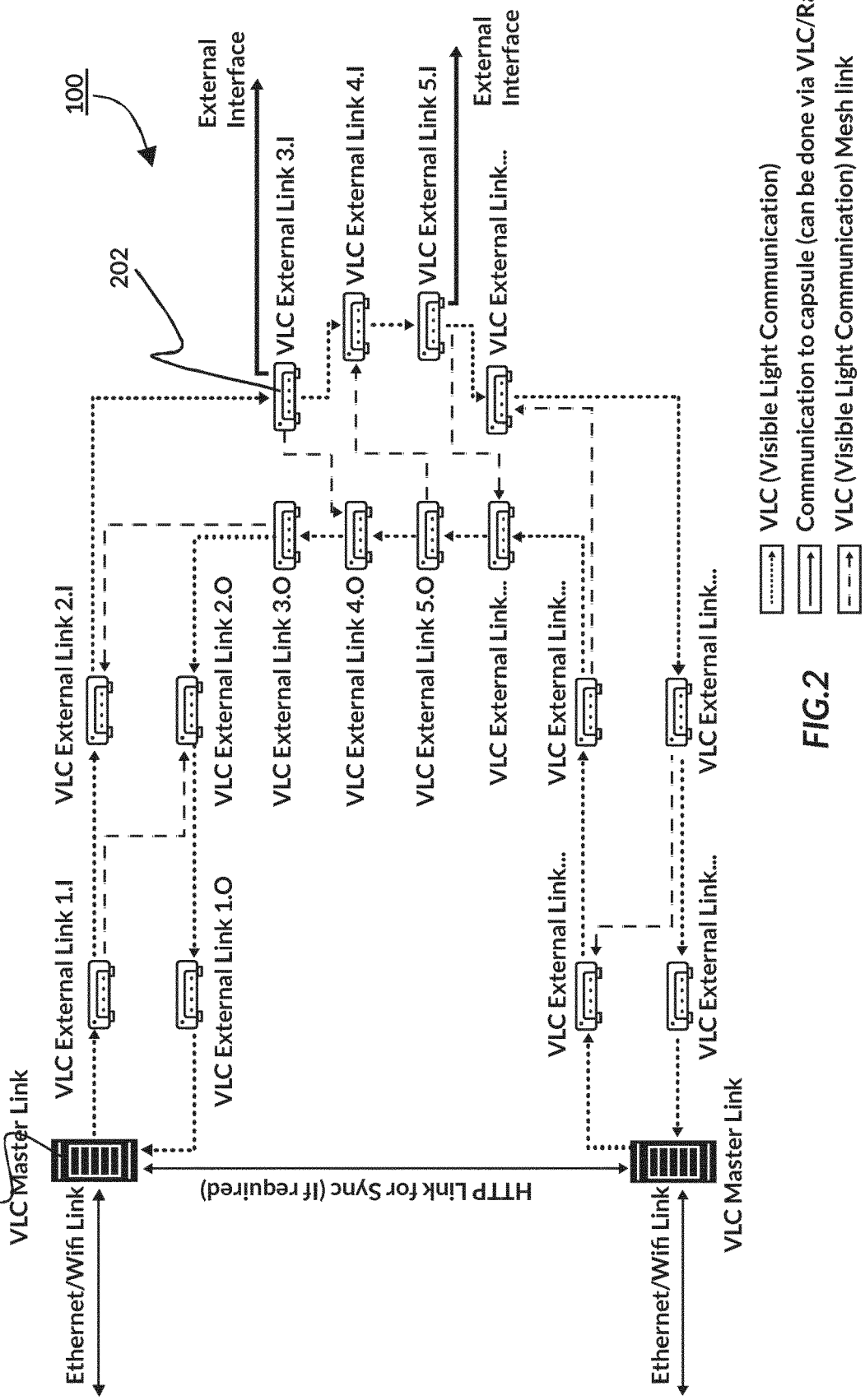
FIG. 2 shows an illustration of an example of the wireless communication system of the present invention in a mesh network topology.
Figure 3:
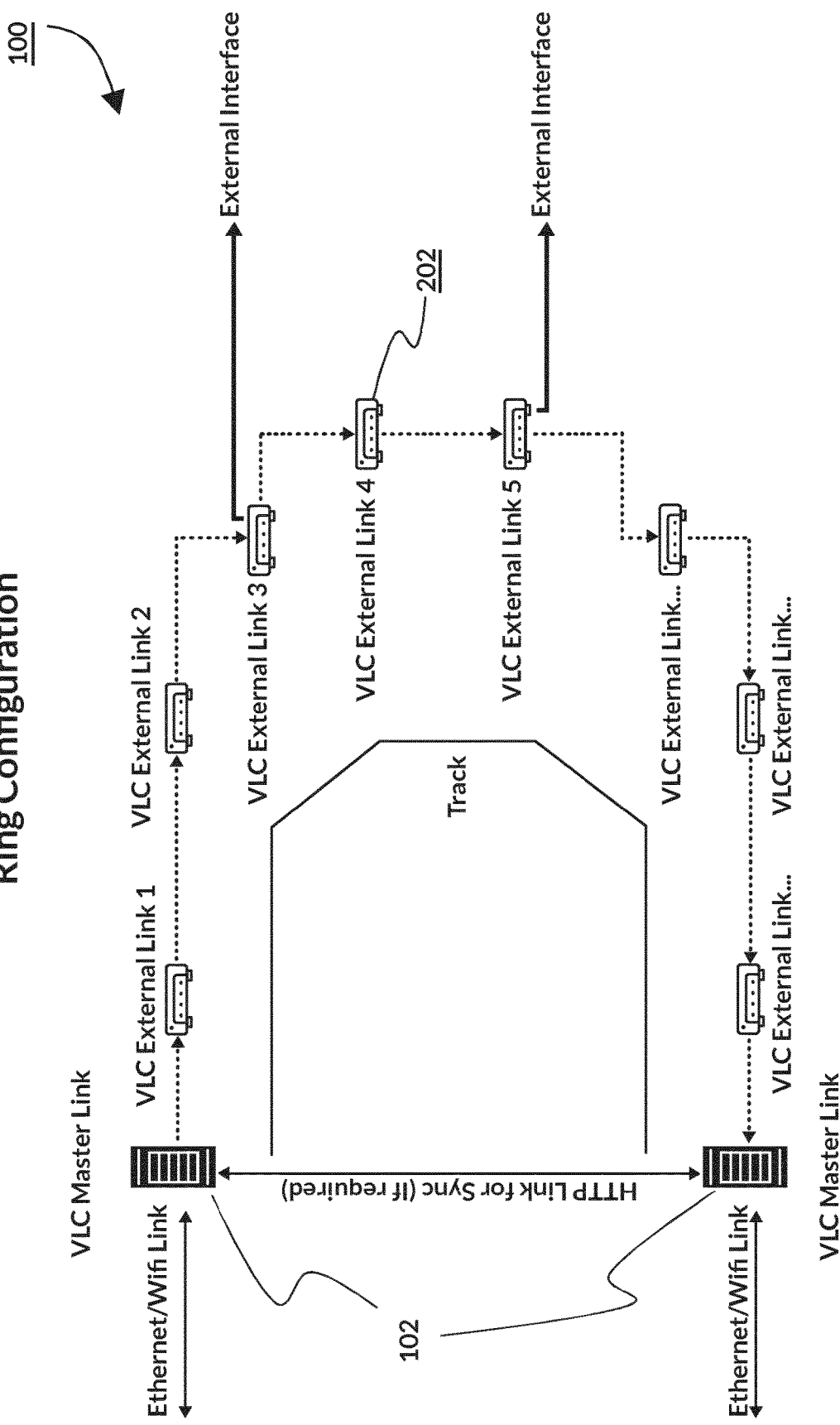
FIG. 3 shows an illustration of another example of the wireless communication system of the present invention in a ring network topology.

FIG. 1 shows the overall system architecture of the present invention, where the VLC master gateway 102 acts as a 'bridge' between VLC Links 202 and Internet/Data Source. Here, every VLC Link 202 drives an external light source 204 which is in communication with the Li-Fi Dongle 302 that is connected to one or more smart devices (computer, smart phone etc.). Further, every VLC link 202 is configured to process a 'smart algorithm' adapted to relay data between other VLC Links, as well as, provide communication to the Li-Fi Dongle 302 via the external light source 204. In order to relay data between multiple VLC Links 202, the system may either utilise a ring topology or a mesh topology. As shown in the example embodiment in FIG. 2, a backbone network of the communication system 100 has been implemented in a mesh network architecture, including two VLC master gateway members 102 and a plurality of VLC link members 202. The mesh network implementation offers an improved fault tolerance (at a higher cost) compared to, for example, the ring network topology (at a lower cost) shown in detail in FIG. 3. Alternatively, the communication system 100 may have a star network topology.

When implemented in a ring configuration, the master gateway members 102 are arranged at the ends of each destination. There, the master gateway members 102 would be connected to the internet via, for example, Ethernet cables or optical fibre cables, in order to provide the bandwidth suitable to sustain a constant and fast data transmission. Though, the ring network topology may be susceptible to single point errors, which may be overcome by installing additional master gateway members 102 along the ring topology.

Figure 4:
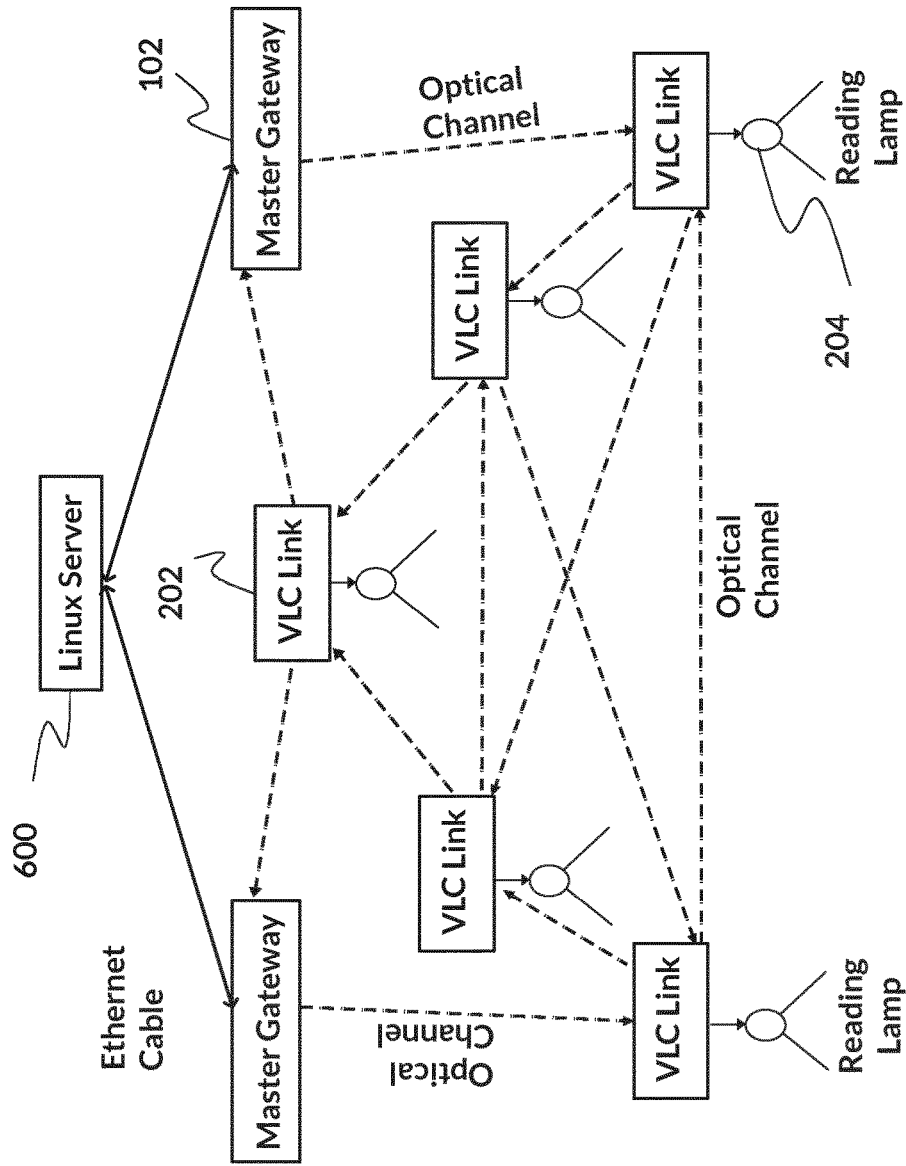
FIG. 4 shows an illustration of a system architecture in a mesh network topology including optical communication channels (Li-Fi, Infrared), as well as, physical communication channels (Ethernet cable)

FIG. 4 shows an illustration of the communication system 100 in a mesh network topology including Li-Fi user access ports 204. The communication system 100 is a full duplex system with separate optical uplink and downlink channels. While the downlink channel utilises visible light LEDs, the uplink channel may utilise invisible Infrared (IR) LEDs. Here, each network VLC link member 202 is acting as a transceiver at all points of the network. The transceiver electronics may be implemented in an FPGA (Field Programmable Gate Array) card, and the data may be stored in a media server, such as, for example, a Linux Server 600.

Furthermore, at least one master gateway member 102 may be connected to the media server 600 via an Ethernet cable. The master gateway member 102 then feeds data into the mesh network. Each network VLC link member 202 is then connected to multiple other network VLC link members 202, so as to form the mesh network topology. In this example, there are two loops connected to two master gateway members 102 along with an internal mesh connection between the network VLC link members 202. In case one of the network VLC link members 202 fails, the master gateway member 102 will be able to reroute the data through a different path via alternative VLC link members 202.

Figure 5:
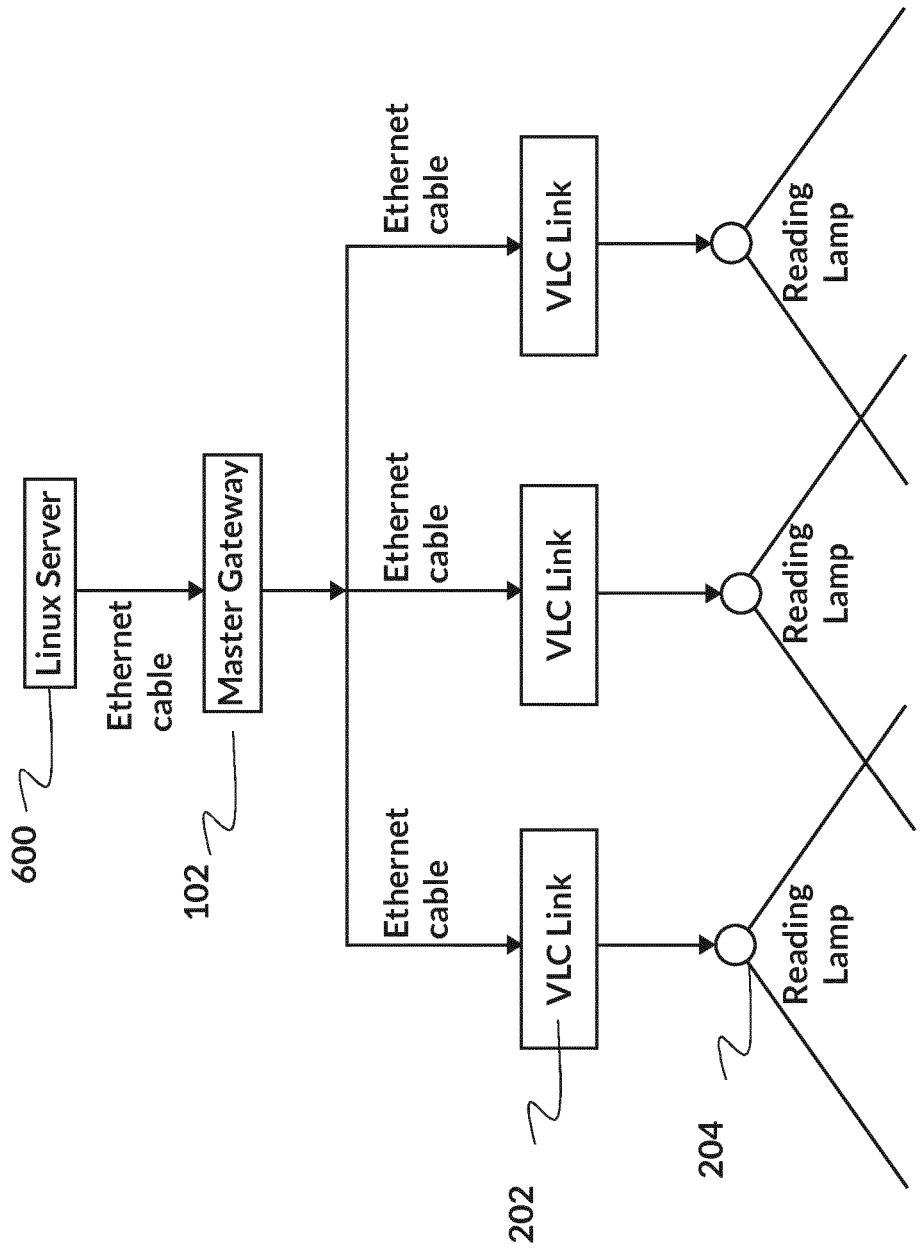
FIG. 5 shows an illustration of a system architecture, wherein the VLC link network members are connected to the master gateway member via Ethernet cables.

FIG. 5 shows a configuration where all network VLC link members 202 are connected to the media server 600 via Ethernet cables, though, an optical Li-Fi channel exists between the user access dongle 302 and the Li-Fi user access port 204 (i.e. LED connected to the network link member 202).

Figure 6:
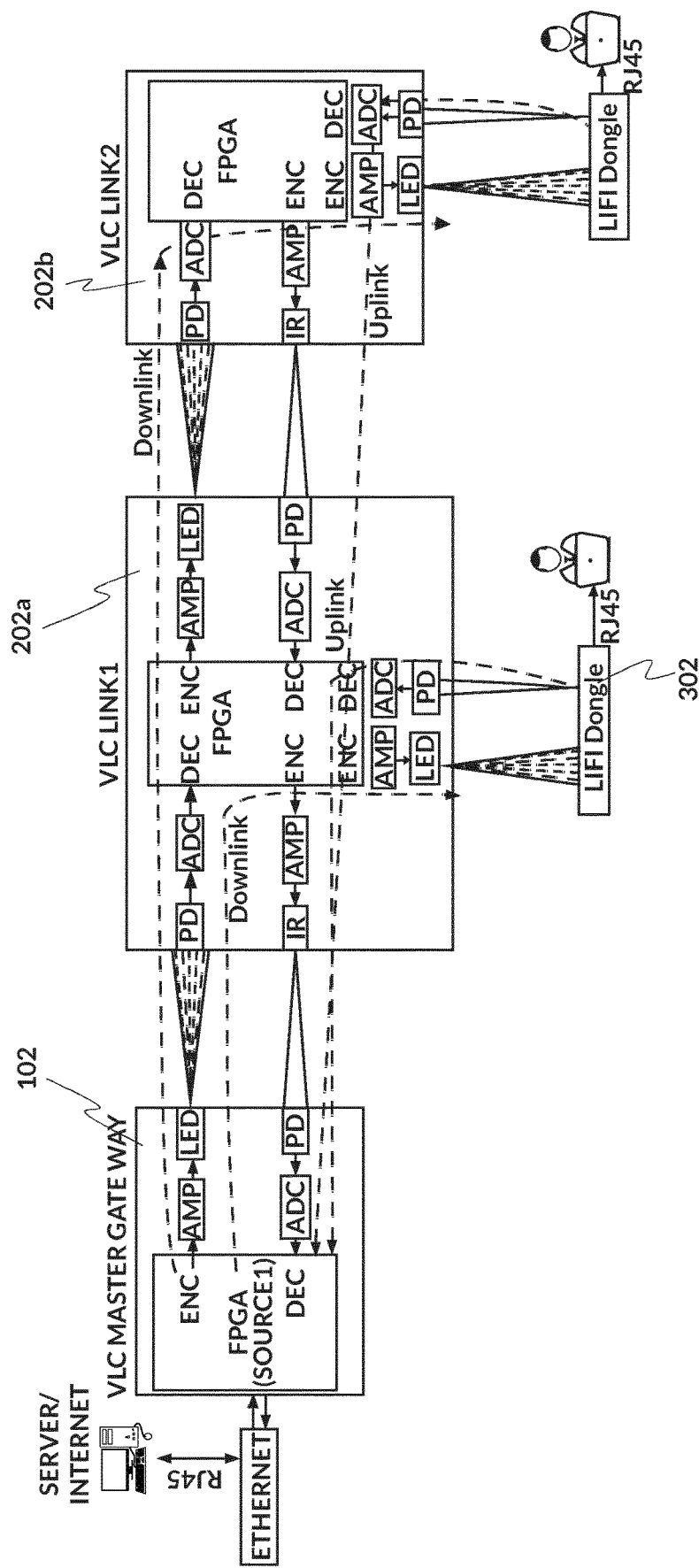
FIG. 6 shows a schematic illustration of the internal block diagram of the VLC Master Gateway and respective VLC Links.

FIG. 6 illustrates a detailed internal block diagram of the VLC master gateway 102 and VLC links 202. The smart algorithm implemented in the system 100 will provide for access the data to/from the server/internet and communication with the destination devices. For example, the middle devices 202 take care of multiplexing uplink access requests to source and relaying downlink access to the any receding devices. The detailed middle device multiplexing (MUX) control is shown in the logic block diagram of FIG. 7, which is the multiplexer logic of the middle A/LC link 1' (see FIG. 6). The A/LC link 1' 202a is utilised for switching between data that is uploaded by middle A/LC link 1' 202a and data that is uploaded by the destination A/LC link 2' 202b, so as to transmit over a common LED transmitter towards the server.

In particular, uplink data incoming from A/LC Link 2' 202b and uplink data incoming from middle A/LC Link 1' 202a is continuously stored in two separate FIFOs and then by MUX control logic 'read enables' of these FIFOs are being controlled to switch between two requests.

Figure 7:
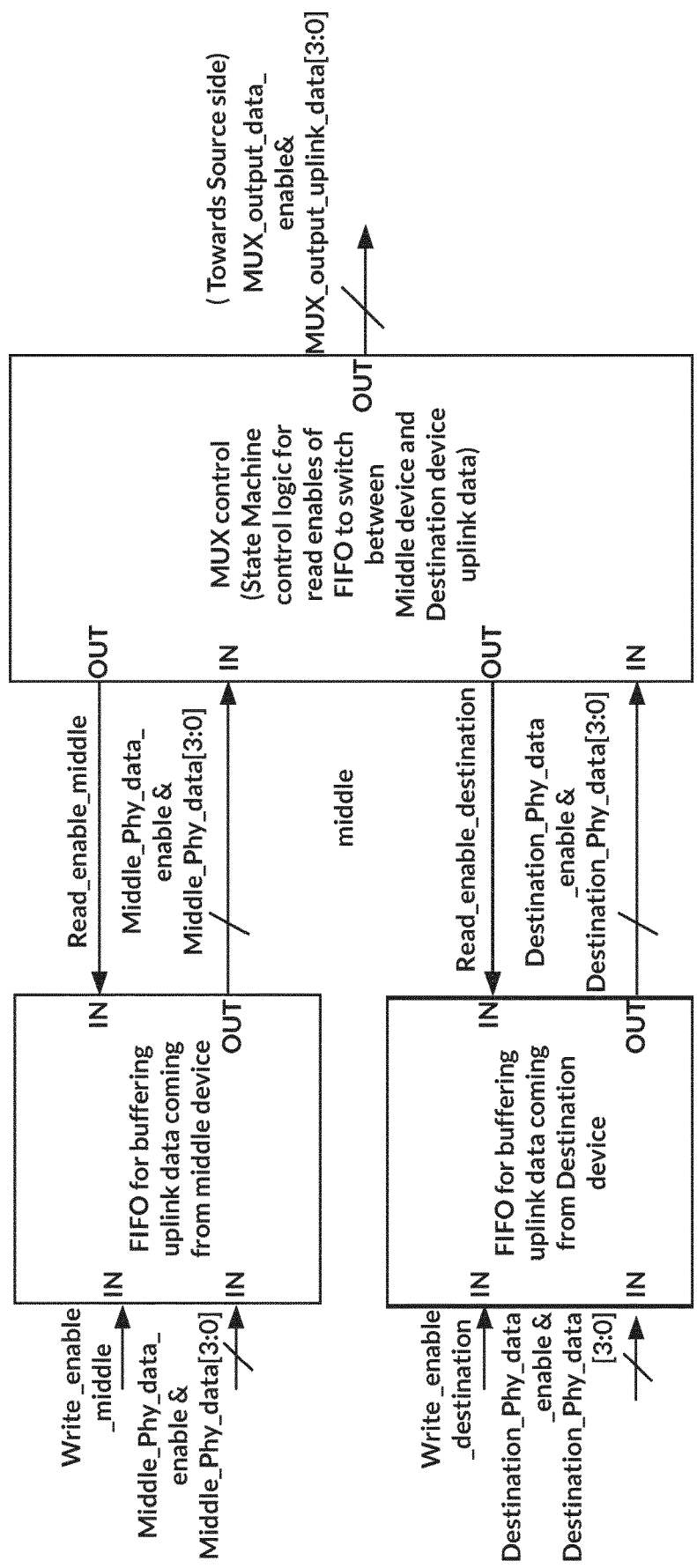
FIG. 7 shows a schematic illustration of the VLC Links MUX (Multiplexer) logic block diagram.

In the example shown in FIG. 7, two counters are implemented with the MUX control to keep track of the number of 'frames' that have been written into the FIFOs separately. The frame number of both sides (FIFO) is continuously monitored utilizing the state machine which is continuously switching between middle A/LC Link 1' 202a and A/LC Link 2' 202b until one complete frame is written. Once a complete frame is detected for any side (FIFO), 'read enable' for that FIFO is asserted to read out that frame, wherein the incoming data of the other side is kept on continuous buffering. The counter is incremented for every incoming complete frame, and at the end of this one read operation, the counter of the second FIFO is checked for the number of frames that were stored during the read operation of the first FIFO. Following, the 'read enable' is asserted for the second FIFO for reading out the number of frames that came in during the first read operation. Now, the data coming in for the first FIFO is continuously buffered and the counter is incremented to keep track of the frames coming in for the first FIFO.

The method allows that the uplink transmission time via the LED 204 towards the server is divided almost equally between both the devices. During downlink, data will be relayed to further destination devices 202 (i.e. 'VLC Link 2', 'VLC Link 3', and so on).

Figure 8:
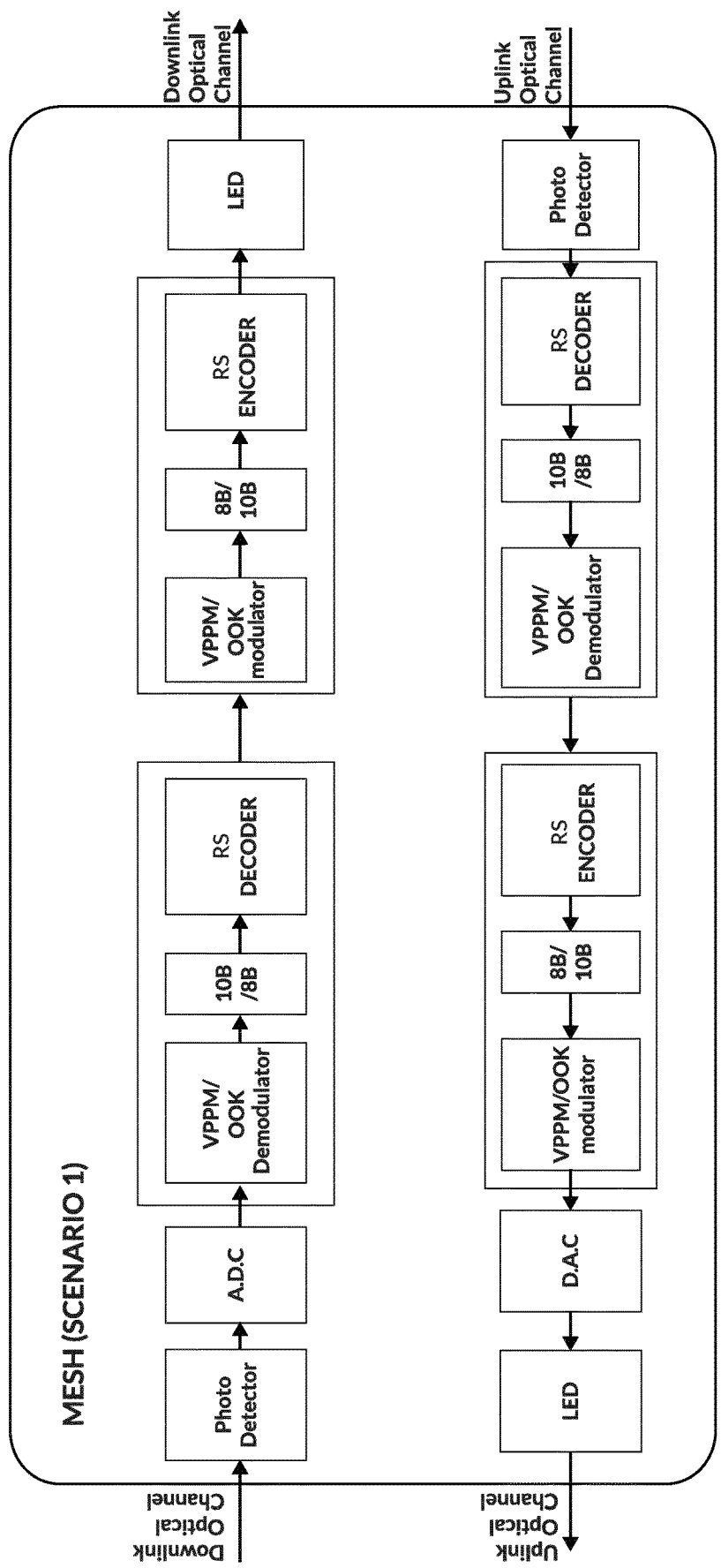
FIG. 8 shows a schematic illustration of a VLC Link network member suitable for use in a mesh network topology, including an uplink optical channel interface and a downlink optical channel interface.

FIGS. 8, 9, 10 and 11 show examples of the hardware components of the communication system 100. In particular, FIG. 8 shows a schematic illustration of the network VLC link member 202, which, when used with Li-Fi technology, may be connected to a reading lamp 204 or any other suitable light source, so as to create the user access point. Here, the network VLC link member 202 is the intermediate device network node through which the communication network is created. The network VLC link members 202 may be controlled by the master gateway member 102, which will manage, for example, the data communication paths to the end user.

Figure 9:
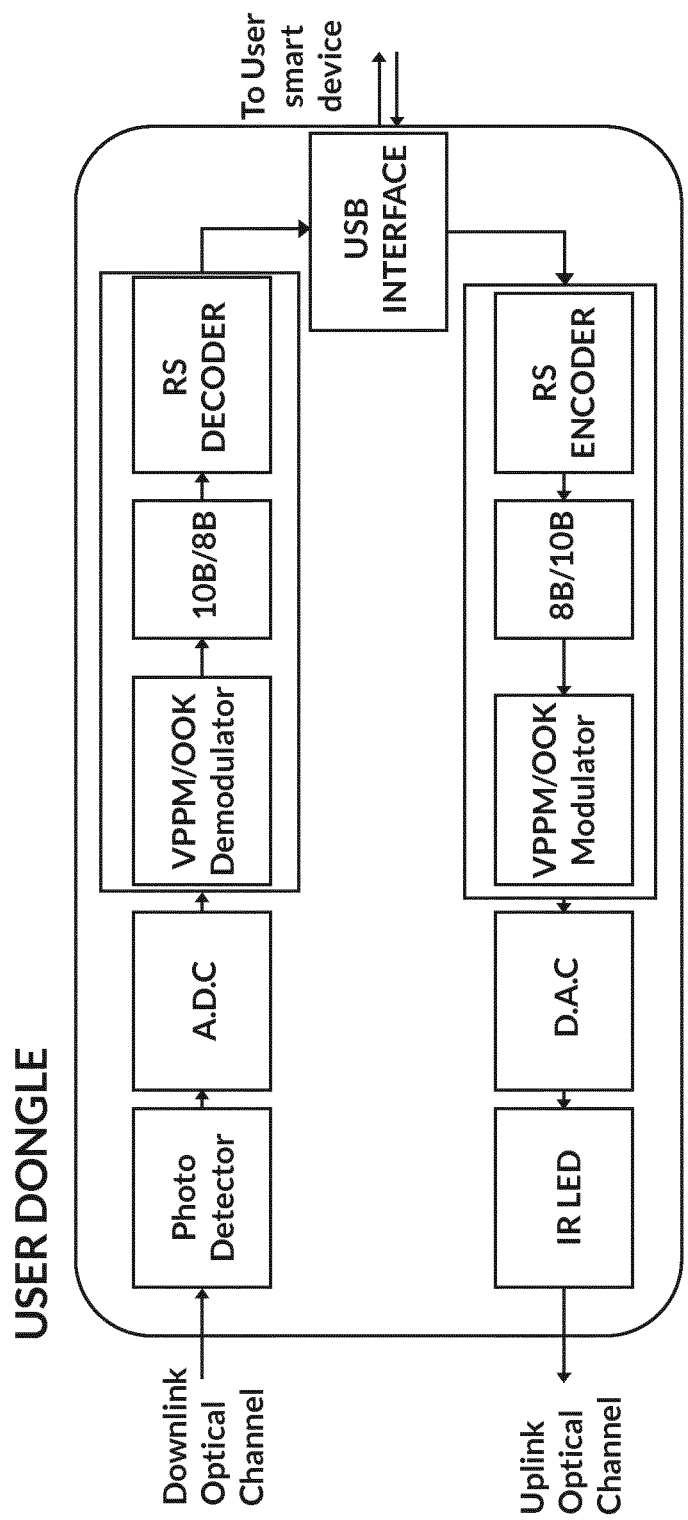
FIG. 9 shows a schematic illustration of a portable user dongle comprising a first interface suitable for connecting to a user device (e.g. USB) and a second interface suitable for communicating via OWC (i.e. optical downlink via Li-Fi, optical uplink via Infrared)

FIG. 9 shows a schematic illustration of the portable user access dongle 302. Both, the network link member 202 and the user access dongle 302 may be implemented on a FPGA (Field Programmable Gate Array) card along with the transmitter and the receiver circuitry. As mentioned earlier, any data received through the downlink channel (VCL) is demodulated and decoded before it is fed through the USB port of the user device 400. The data from the data source is fed to the FPGA card from the USB port of the user device 400, where it is encoded and modulated according to uplink channel communication (i.e. IR channel).

Figure 10:
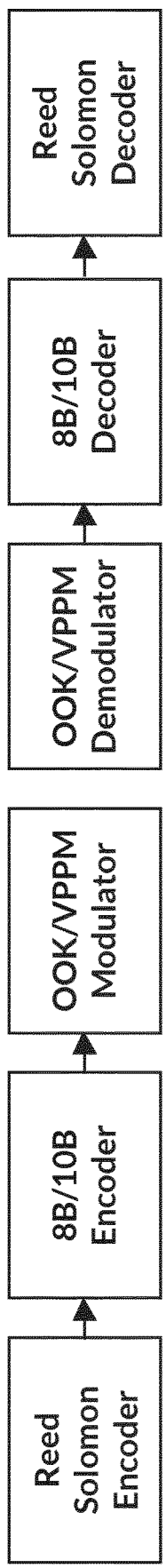
FIG. 10 shows a simplified illustration of the physical layers of a user dongle and a VLC Link network member.

FIG. 10 shows the physical layer of both the user access dongle 302 and the network VLC link member 202. Here, the input frame is block-coded for error correction using a Reed Solomon encoder (160,128 code). This is followed by 8B/10B encoding, which provides bandwidth efficient RLL coding.

The following two types of modulation schemes may be used:
- (i) OOK: Since the system designed by us is non-coherent (IM/DD), On/Off-Keying is the simplest way to drive the LED.
- (ii) VPPM: Variable-PPM is implemented by us in dimmable systems. The brightness of LED is controlled by the pulse width of each VPPM pulse.

Figure 11:
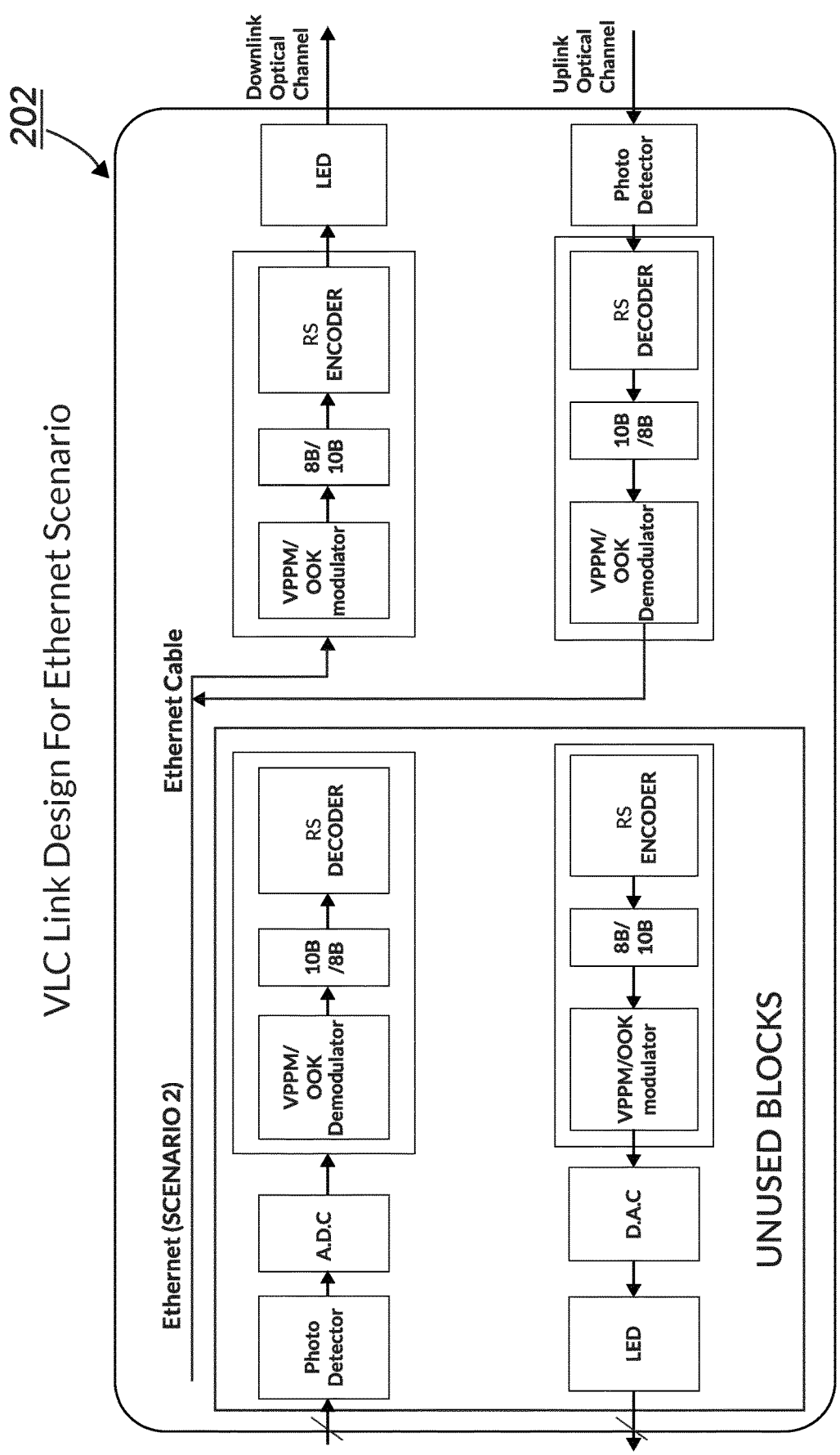
FIG. 11 shows a schematic illustration of a VLC Link network member, when connected to a master gateway member via Ethernet cables (i.e. optical communication interface is bypassed)

FIG. 11 shows an alternative scenario, where the network VLC link members 202 are connected to a media server 600 using Ethernet cables. On the downlink, the Ethernet packets received by the network VLC link member(s) 202 are directly modulated and encoded, so as to be sent directly to the user access dongle 302. Similarly, on the uplink, the data received from the user access dongle 302 is demodulated and sent to the media server 600 using Ethernet cables.

Referring now to the master gateway member 102, which in general terms, is quite similar to a Wi-Fi router, where an Ethernet input or optical fibre input is used to provide the data to the router. Though, one of the main differences is that after the data has been received at the master gateway member 102, the input data is converted according to VPAN standard (i.e. Visible-light Personal Area Network). Furthermore, a full-duplex optical communication channel is established with the network VLC link member(s) 202, wherein the downlink channel is provided utilising visible light and the uplink channel is provided utilising invisible light (i.e. near Infrared (IR) light spectrum).

Figure 12:
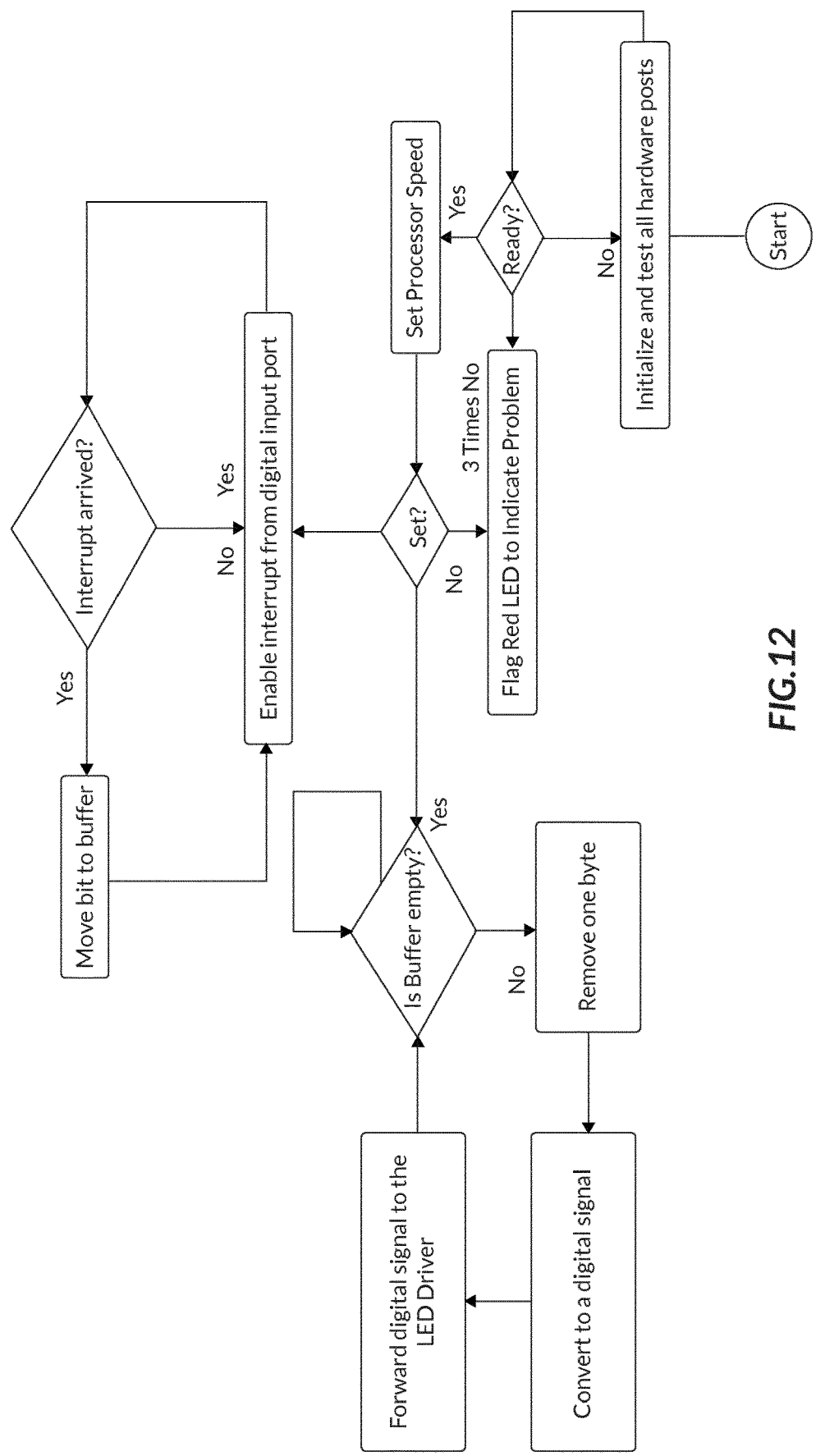
FIG. 12 shows a workflow diagram of the transmitter used in a VLC Link network member, a master gateway member and a user dongle of an example network system of the present invention.
Figure 13:
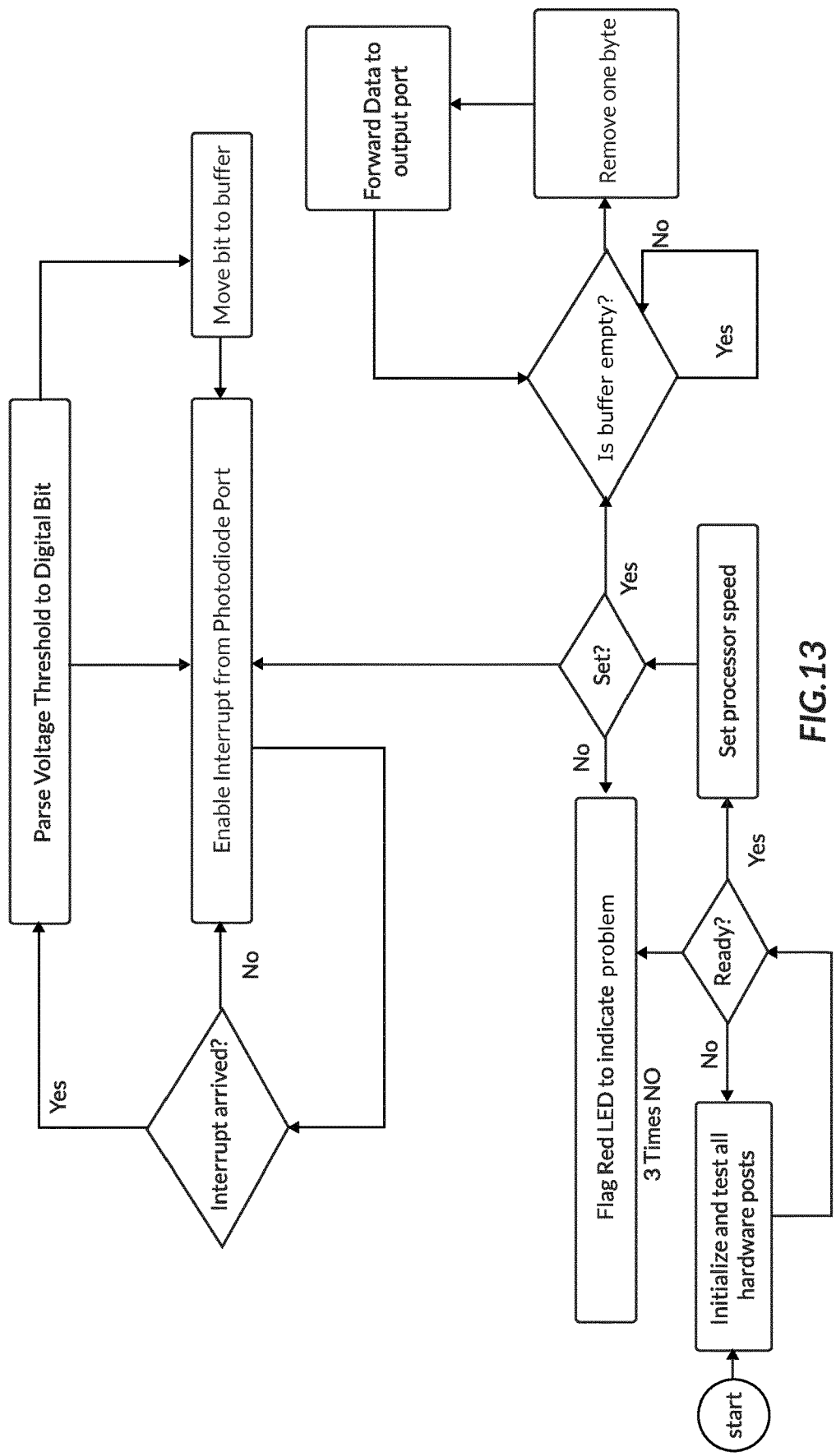
FIG. 13 shows a workflow diagram of a receiver used in a VLC Link network member, a master gateway member and a user dongle of an example network system of the present invention.

FIGS. 12 and 13 show example workflow diagrams for a transmitter and a receiver, respectively, provided in the network VLC link member(s) 202, the master gateway member(s) 102 and the user access dongle(s) 302.

Figure 14:
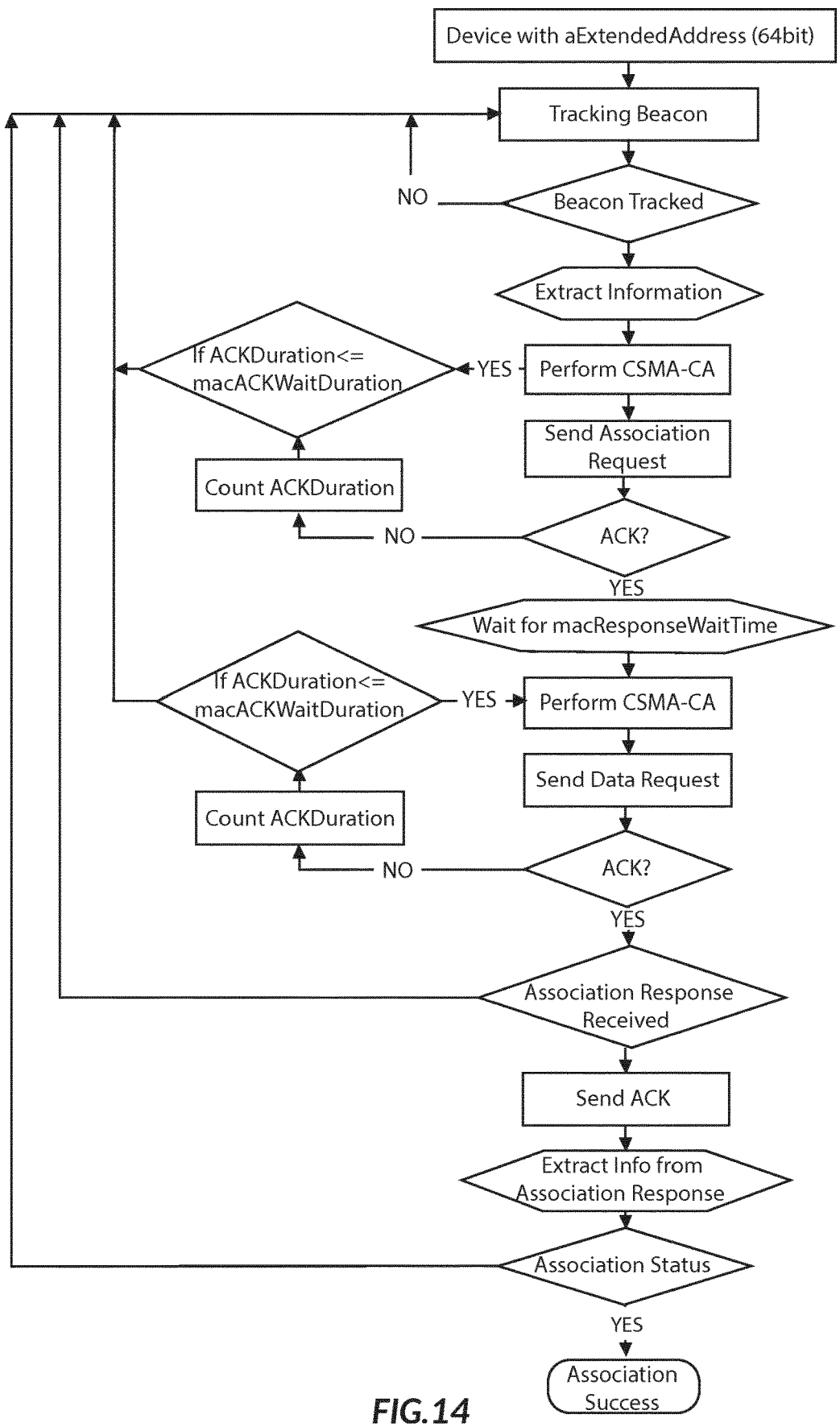
FIG. 14 shows a detailed (logic) workflow diagram of the algorithm utilised for the dongle association with the VLC Link.

For association with a VLC link 202, the Li-Fi dongle 302 may process the detailed algorithm shown in FIG. 14.

As discussed earlier, the Li-Fi dongle 302 is a device that can be connected to any smart device, such as, for example smartphones, PC's, Laptops, therefore allowing the communication of data via light source (VLC Links 202).

In this particular example, every VLC Link 202 drives an external light source 204, so as to provide a personal area network. VLC Master Gateway 102 provides a unique VPANId (VLC Personal Area Network ID) to each VLC Link 202 and stores the VLC link(s) extended address(es) (i.e. default address) into a database. Whenever a Li-Fi dongle 302 is connected and powered on, it starts tracking the beacons transmitted by the VLC Links 202. In particular, every VLC Link 202 transmits beacon frames at predetermined intervals to then wait for the association request from a Li-Fi dongle 302 that wants to associate with the VLC link 202.

So, when a Li-Fi dongle 302 receives a beacon transmitted by a VLC Link 202, it requests for association with that specific VLC Link 202. When the VLC Link 202 has sufficient resources, it will acknowledge the association request and the Li-Fi dongle 302 will be associated with that VLC Link 202. Once the Li-Fi dongle 302 is associated with the VLC Link 202, data communication will only be provided between the Li-Fi dongle 302, the associated VLC Link 202 and the server/internet.

Typically, every Li-Fi dongle 302 has a unique device address (e.g. 64 bit). Once Li-Fi dongle is associated with a VLC Link 202, the Li-Fi dongle 302 will receive a short address (e.g. 8 bit), which is provided by the associated VLC Link 202. The short address will be changed every time the Li-Fi dongle 302 moves from one light source 204 to another light source 204 of the network (i.e. one VLC Link 202 to another). The VLC Link 202 is keeping track and sends information to the Li-Fi dongle 302 using its short address.

Figure 15:
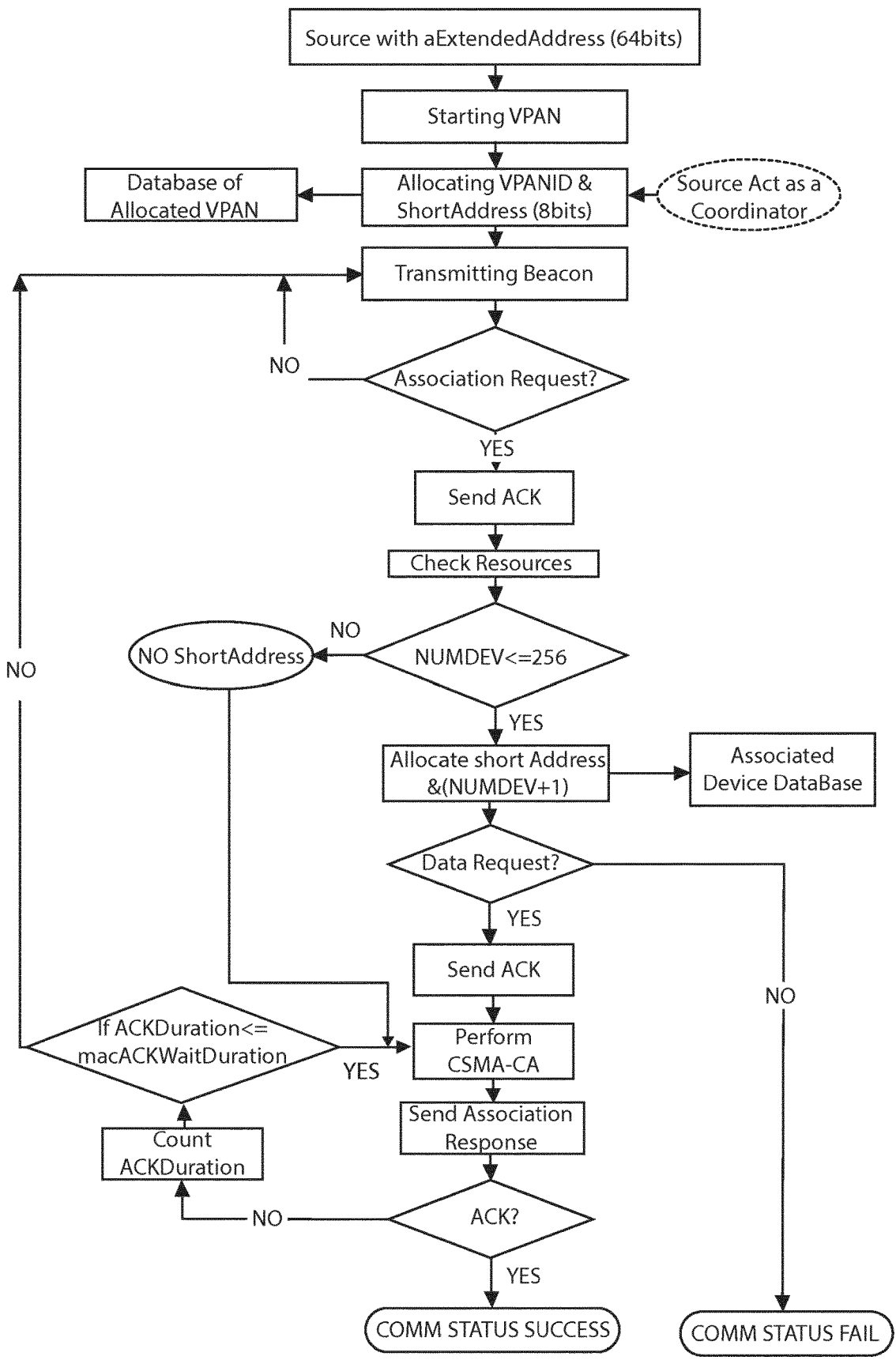
FIG. 15 shows a detailed (logic) workflow diagram of an algorithm utilised for VLC Links to associate multiple devices (Li-Fi Dongle)

The algorithm run by the VLC link 202 for association with the Li-Fi dongle 302 is shown in detail in FIG. 15.

In particular, when the VLC Link 202 gets a VPANId (VLC Personal Area Network identifier), it allocates a new short address to itself and starts transmitting a beacon. In the event a device (e.g. Li-Fi dongle 302) wants to associate, the device would track that beacon when sufficiently close to the light source 204. Once the device (e.g. Li-Fi dongle 302) tracks a beacon, it will extract information from the tracked beacon and perform CSMA-CA (Carrier Sense Multiple Access-Collision Avoidance) to send an association request command to the VLC Link 202 for association. The device will then wait for the acknowledgement (ACK). The acknowledgement to an association request command does not mean that the device has been associated. The higher layers of the VLC Link 202 require some time to determine, whether the current resources available on the VPAN (VLC Personal Area Network) are sufficient to allow another association. At the same time, the VLC Link 202 will be waiting for the association request and continue with the beacon transmission until the VLC link 202 receives the association request command. Once received, the VLC link 202 will send the acknowledgement and when the device (e.g. dongle 302) receives the acknowledgement, it will wait for 'macWaitResponseTime', otherwise it performs the 'ackWait' (see below) procedure. In the time interval 'macWaitResponseTime', the VLC Link 202 will check its resources, generate association response command with 'shortAddress field' (updated as shown in table 1), and wait for 'Data Request Command'.

After completion of 'macWaitResponseTime', the device (i.e. dongle 302) will perform CSMA-CA to send a 'Data Request Command' to ensure the communication, and it will then wait for the acknowledgement. Once the VLC Link 202 receives the data request, it will send the acknowledgement and perform CSMA-CA, in order to send the generated association response command. Otherwise, it will issue to the higher layer that the communication status failed. In case the device (i.e. Li-Fi dongle 302) receives the acknowledgement for 'Data Request Command', it will further wait for association response command, which when received, the device (Li-Fi dongle 302) will send an acknowledgement and extract the information, check the association status field, and, if this field is 'true', it will issue association as successful to its higher layer. In case it is 'false', the process will be repeated by tracking the beacon. In another case, if the acknowledgement is not received, it will perform the 'ackWait' procedure (see below).

In the event, the VLC Link 202 receives acknowledgement for association response command, it will issue the communication status 'success' to the higher layer, otherwise it will perform the 'ackWait' procedure.

'ackWait' Procedure:

This procedure executes when acknowledgement is not received:
(i) Start count the 'ACKduration' just sending any frame.
(ii) If 'ACKduration' is less than or equal to perform the process starting from CSMA-CA and retransmission of the frame, otherwise start the whole association procedure from start.

TABLE 1

| Short Address (8 bits) (HEX representation) | Comment |
|---|---|
| 0x00-0xfd | Addresses for allocation |
| 0xfe | Associate but Short Address not allocated Can communicate with Extended Address |
| 0xff | Not associated (Only Broadcast) |
| Extended Address: | 64 bits - 0x0000000000000000-0xffffffffffffffff |
| VPANId: | 16 bits - 0x0000-0xffff |

When in use, the software embedded in the communication system 100 may contain standard procedures for Digital Signal Processing (DSP), i.e. taking care of converting the digital signals from the input port into a signal that can be transmitted by the LED's (light source), after applying one or more modulations. At the receiver end, the embedded software ensures the regeneration of the transmitted signal and the signal processing. The standard followed is similar to the standard defined in 802.15.7 (i.e. VLC standard), which denotes the rules for the physical layer in the VLC standard. Using this standard also enables any application developers to simply reuse the existing stack and integrate it with the stack of the communication system 100 of the present invention, therefore facilitating writing applications for the communication system 100. Another module of the code deals with assigning the physical addresses to any one of the hardware modules 102, 202, 302, following similar conventions for framing techniques as defined for the MAC Sub Layer (Media Access Control) of the Data Link Layer. This takes care of error detection and any corrections for simplex channels and frame acknowledgement, as well as, retransmission procedures for the duplex channels.

Figure 16:
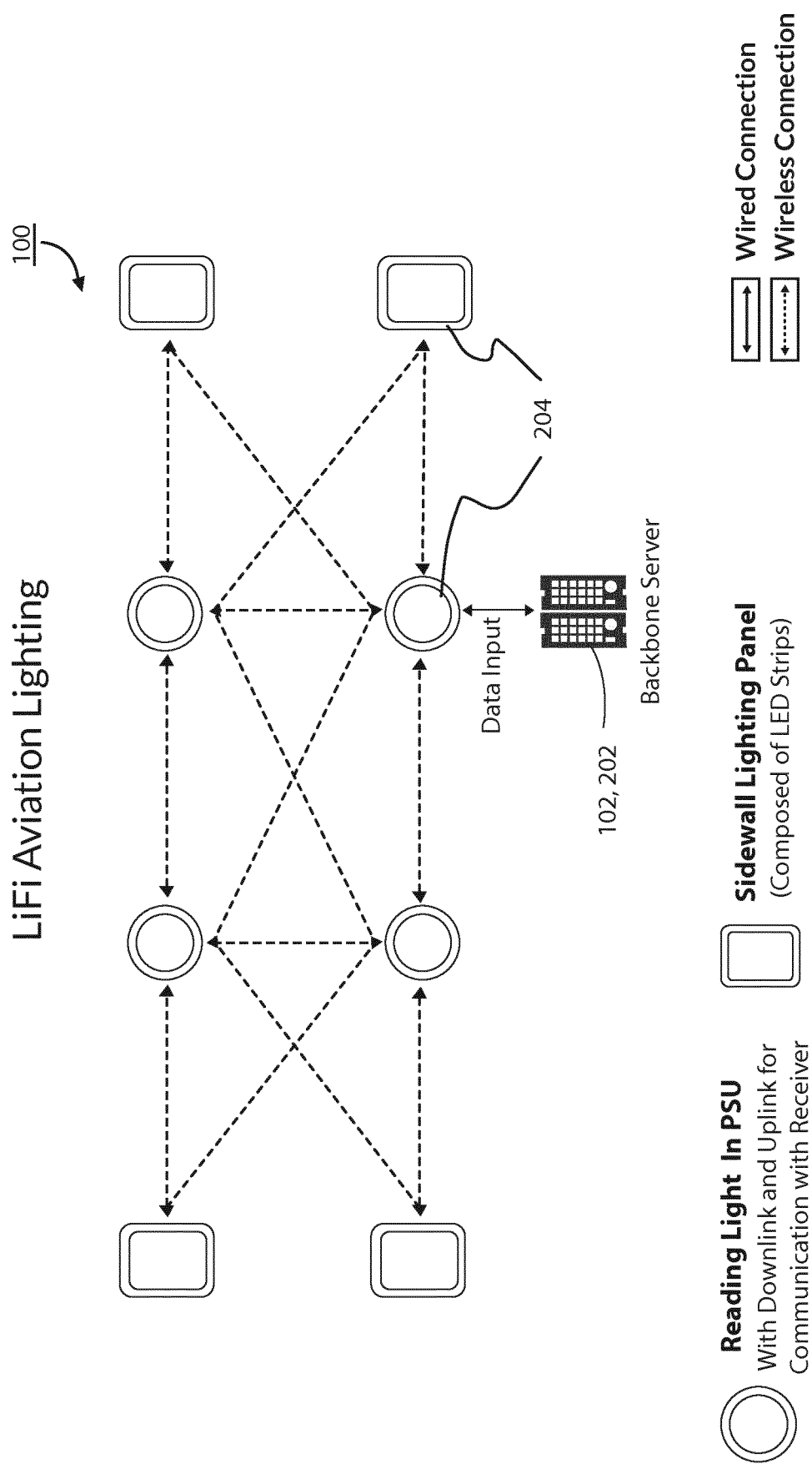
FIG. 16 shows a simplified illustration of an example network system of the present invention utilising a mesh network topology when implemented within an aircraft cabin.

FIG. 16 shows an example embodiment of the communication system 100 when implemented into an aircraft cabin. In this particular example, the system 100 is used for a typical In-flight Entertainment system utilising three or four reading lamps 204 to transmit the data to the user, sitting under and connected to the Li-Fi network provided via the reading lamp(s) 203. Each user may connect, for example, up to four different devices 400 seamlessly (e.g. personal laptop, tablet, mobile phone etc.) to the network via the Li-Fi user access dongles 302 and the reading lamps 204 (Li-Fi interface). Specific software applications may have to be installed by the user in order to stream data onto the user devices 400.

Figure 17:
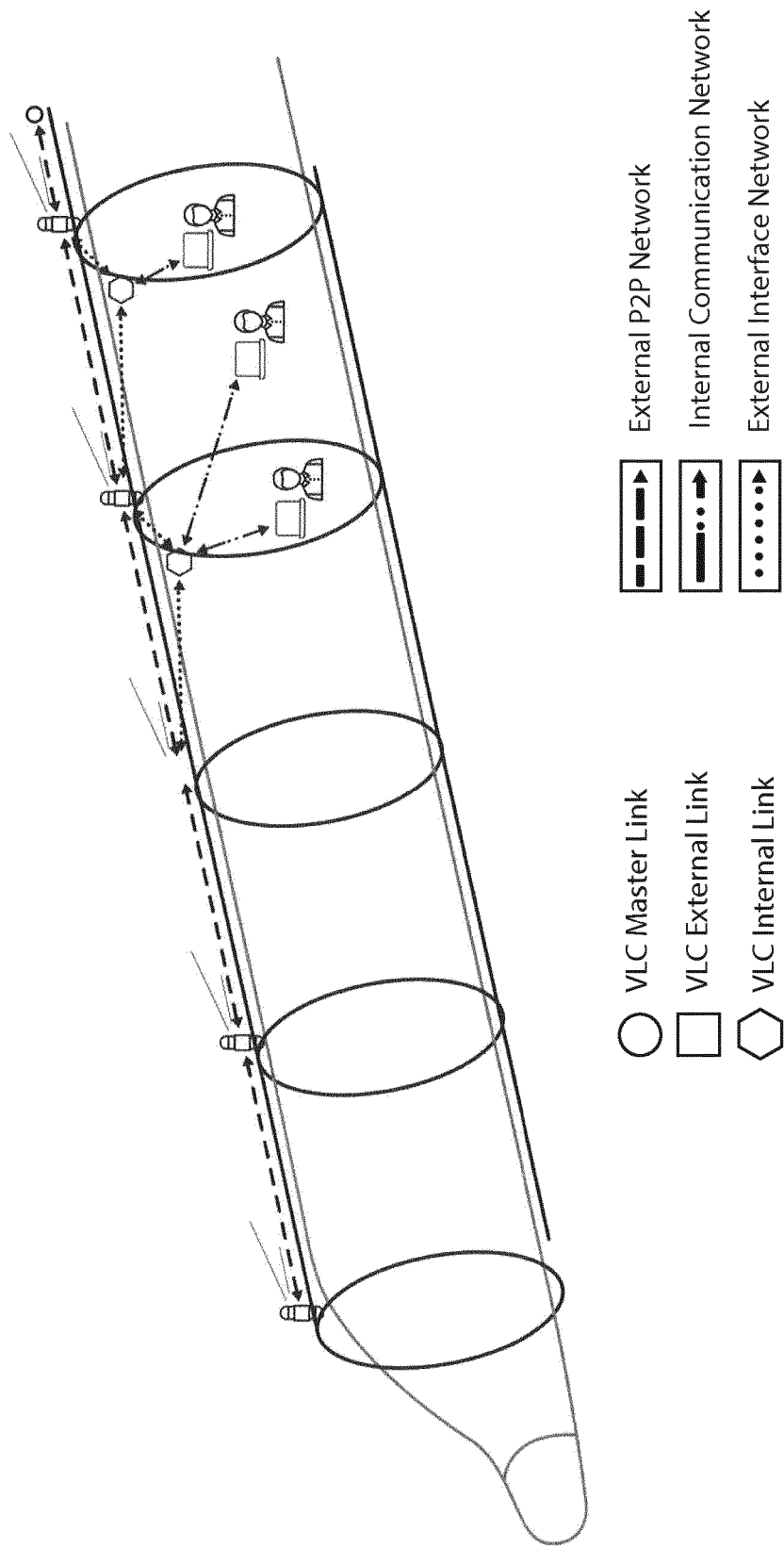
FIG. 17 shows a schematic illustration of an example network system of the present invention when implemented within a train.

FIG. 17 shows an example embodiment of the present invention, set up in a train shuttle, so as to allow data connectivity to the passengers using external P2P (point-to-point) Network (Ring or Mesh Topology) that relays data all across the track lines. All of the data communication between the passengers in the shuttle and the outside world would be provided over the VLC using Li-Fi technology. In particular, every pillar of the train carriage structure may be equipped with one or more network VLC link members 202, wherein the end points of the train may be provided with the master gateway members 102, therefore forming the backbone of an External P2P Network. In order to communicate between the carriage and the backbone infrastructure, the carriage may requires dedicated internal network VLC link members 202 that are integrated, for example, into the roof structure of each one of the carriages. These VLC link members 202 may then tap into the light communication of the external P2P network and then share its data bandwidth with the devices inside the carriage (forming an external interface network). One or more smart devices inside the carriage may have a Li-Fi user access dongle 302 connected to the Li-Fi ports of the network VLC link members 202 provided at the ceiling of the carriage, the data is then transmitted via the VLC link members 202. Again, all communication channels may be configured to provide full-duplex mode.

Figure 18:
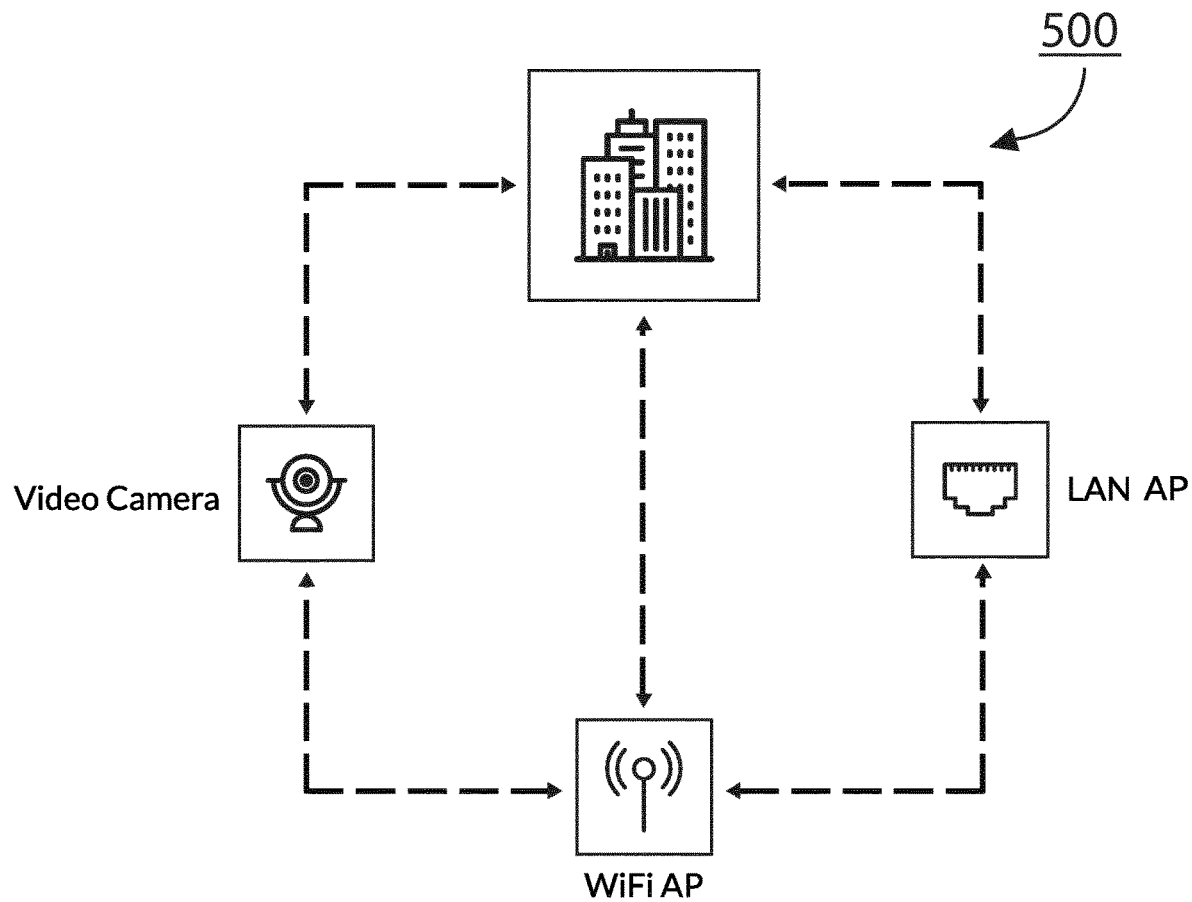
FIG. 18 shows a simplified illustration of an example network system of the present invention when implemented within a building infrastructure.

FIG. 18 shows an illustration of a typical setup for an IT building infrastructure.

Figure 19A:
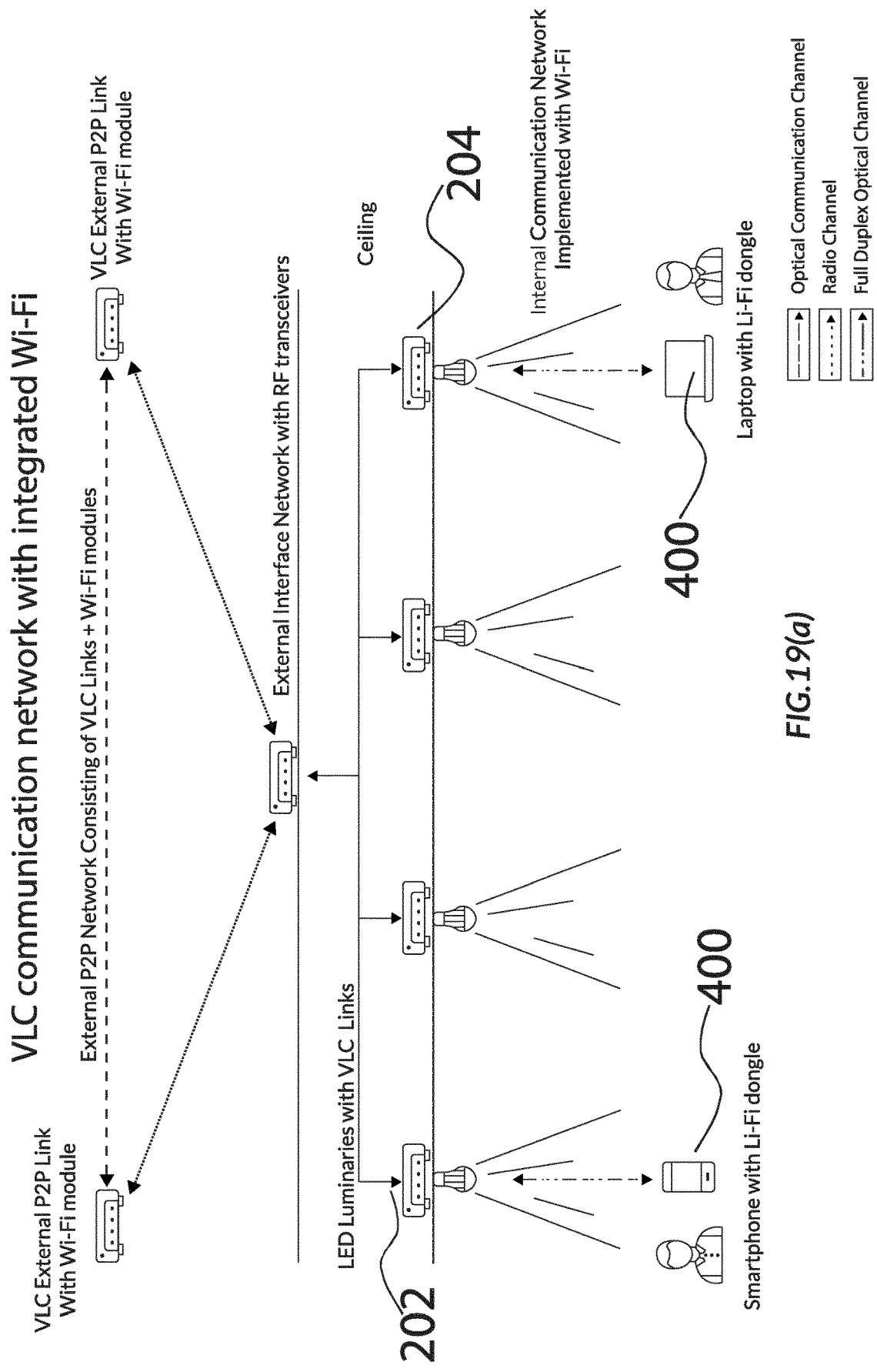
FIG. 19 shows an illustration of an example network system of the present invention (a) utilising integrated Wi-Fi for external Interface Network communication (i.e. RF external interface, Li-Fi internal user interface), and (b) utilising integrated Wi-Fi for external interface communication, as well as, internal interface communication (i.e. RF external interface and internal user interface)
Figure 19B:
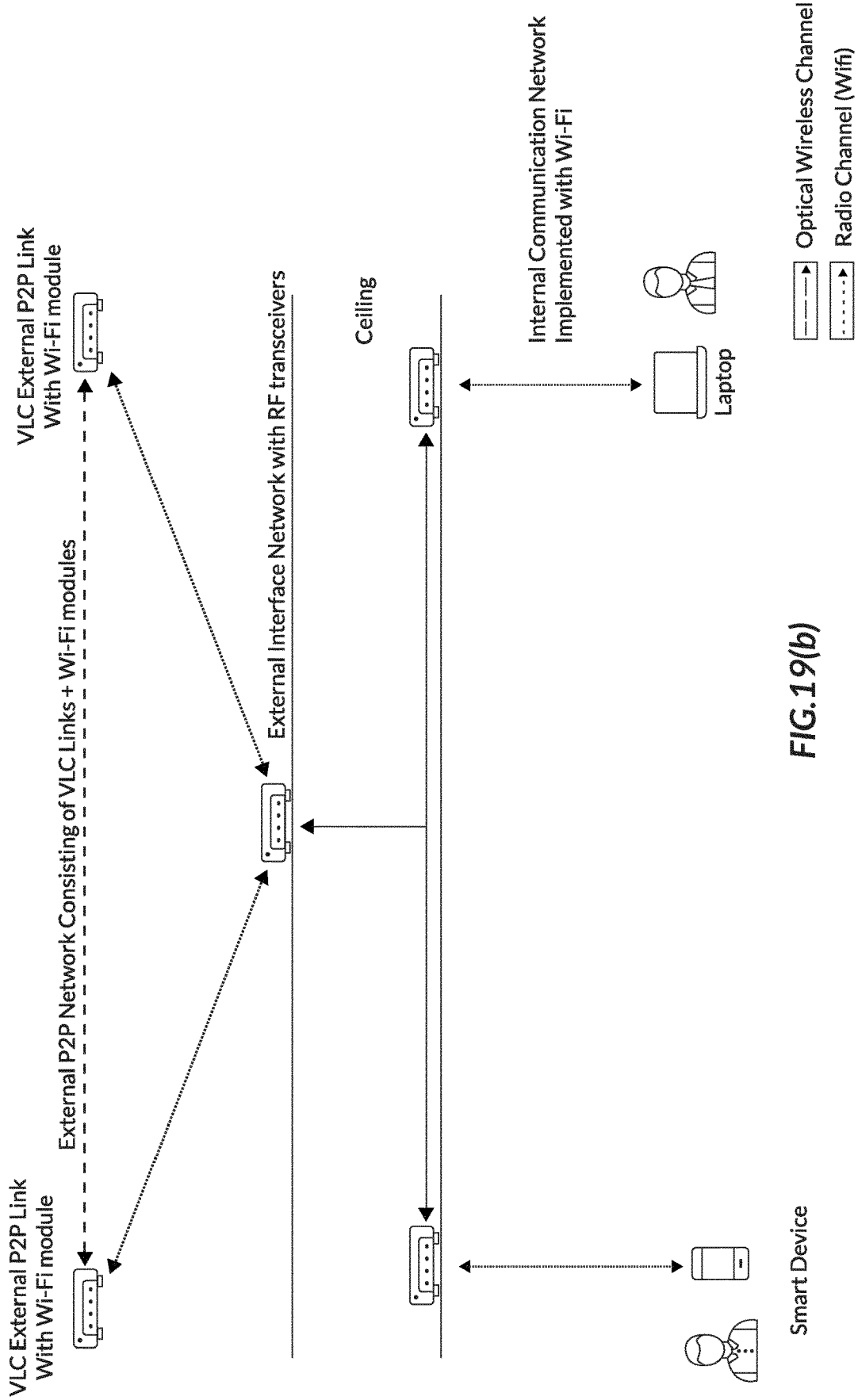

FIGS. 19 (*a*) and (*b*) show further illustrations of alternative example embodiments of the communication network 100 of the present invention. Here, the network configuration is adapted to utilise a Li-Fi mesh network technology, as well as, RF (Wi-Fi) technology, so as to create a hybrid network system that may provide an improved reliability in locations that are known to be challenging for wireless network communication, such as, for example, in underground metros or tunnels.

In the setup shown in FIG. 19 (*a*), the external P2P network and the internal communication network are established via Li-Fi communication, wherein the external interface network is provided via Wi-Fi communication. Here, the external P2P network may have Li-Fi and Wi-Fi modules installed at every pillar of the train carriage structure. So, the backbone network would still use Li-Fi communication, but the external interface network is provided by Wi-Fi to exchange information between the P2P network and internal communication network. It is understood that to utilise this hybrid setup, the carriage would have to be equipped with additional RF transceivers. Though, the Wi-Fi radio waves are not required to penetrate the carriage's hull, but only provide a bandwidth for the space between the carriage and the loop's ceiling. Inside the carriage, the passengers' devices would again utilise their Li-Fi user access dongles 302 in order to exchange data with the internal communication network.

In the setup shown in FIG. 19 (*b*), the external P2P network is communicating utilising Li-Fi, wherein the external interface network and the internal communication network are implemented utilising a Wi-Fi system. In particular, the external P2P network communicates along the train using Li-Fi communication, wherein every network VLC link member 202 along the track further comprises a Wi-Fi module.

Again, the carriage(s) would have to be fitted with RF transceivers, so that the broadcasted Wi-Fi bandwidth from the external P2P network can be captured and passed along to the internal communication network for passengers to be used, and effectively creating the external interface network. In this particular scenario, the end user does not require a Li-Fi user access dongle 302, but simply enables the Wi-Fi interface of the user device.

Figure 20:
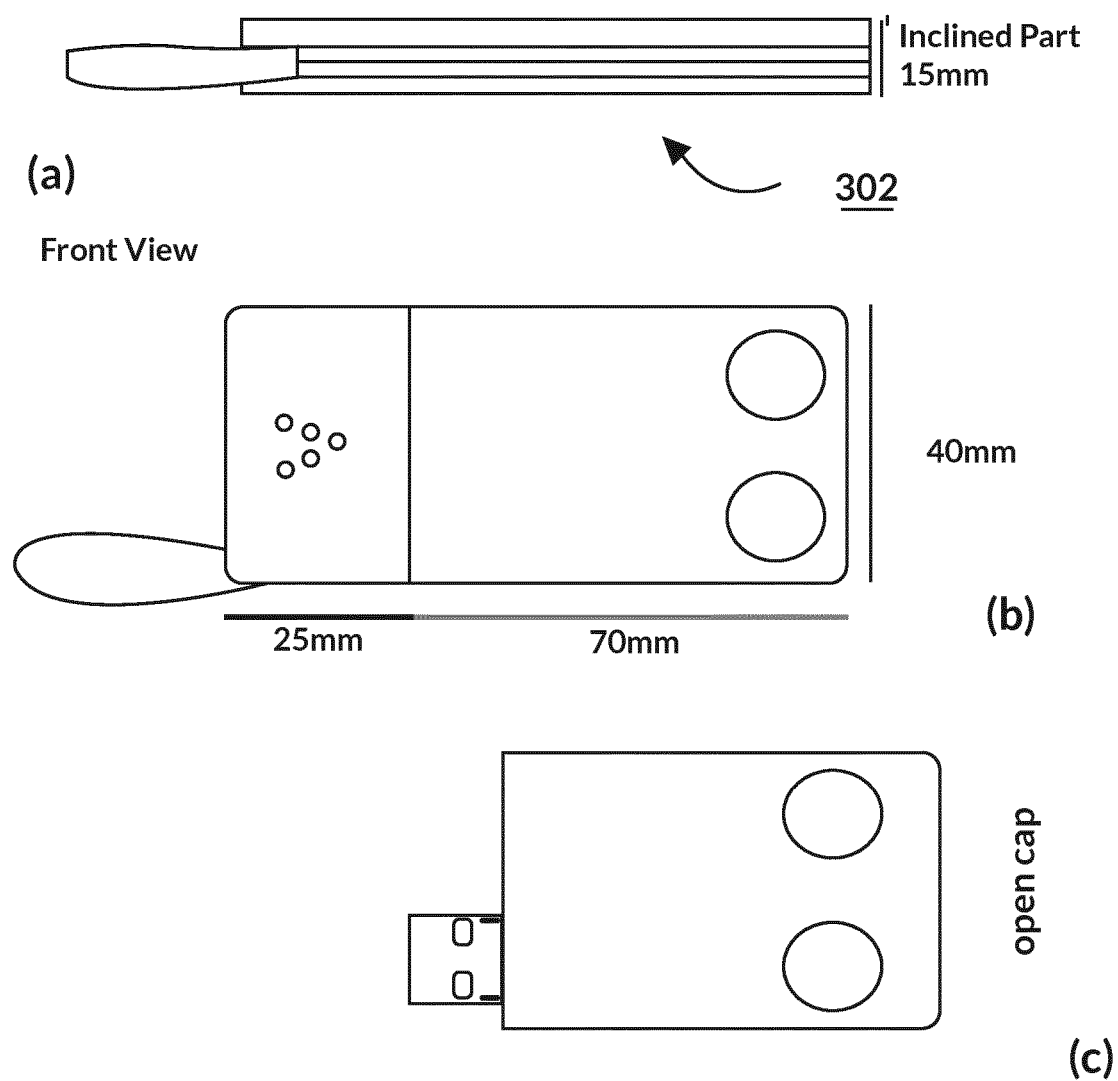
FIG. 20 shows an illustration of an example design of a portable user dongle from (a) side view, (b) top view and (c) top view with the cap removed (i.e. showing the USB port).

FIG. 20 shows an illustration of an example design of a portable user dongle from (a) side view, (b) top view and (c) top view with the cap removed (i.e. showing the USB port).

It will be appreciated by persons skilled in the art that the above embodiment(s) have been described by way of example only and not in any limitative sense, and that various alterations and modifications are possible without departing from the scope of the invention as defined by the appended claims.

The invention claimed is:
1. A full-duplex communication system, comprising:
a plurality of network members, each one comprising at least one first communication interface adapted to communicatively couple to any other one of the of said plurality of network members and at least one user device via optical wireless communication (OWC);
at least one gateway member, comprising at least one second communication interface adapted to communicatively couple to any one of said plurality of network members via optical wireless communication (OWC), said at least one second communication interface is further adapted to communicatively couple to at least one external communication network;
at least one portable access member, operably connectable to a user device and comprising at least one third communication interface adapted to communicatively couple said user device to any one of said plurality of network members via optical wireless communication (OWC), and wherein said communication system is adapted to form any one of a duplex ring network topology and a duplex mesh network topology, utilising said plurality of network members and said at least one gateway member;

characterized in that, the at least one portable access member is a user access dongle connected to a user device, wherein the user device is a smart device and one or more of said at least one gateway member is adapted to control any one of said plurality of network members, wherein the gateway member provides a unique id and address to each network member and the network member starts transmitting a beacon, the portable access member captures the beacon and performs CSMA-CA (Carrier Sense Multiple Access-Collision Avoidance) for association, so as to determine at least one data communication path to the at least one user device.

2. The full-duplex communication system according to claim 1, wherein at least a portion of said plurality of network members and said at least one gateway member are adapted to form an optical wireless communication (OWC) backbone network of said communication system.

3. The full-duplex communication system according to claim 1, wherein any one of said first communication interface, said second communication interface and said third communication interface is adapted to provide Visible Light Communication (VLC) and Infrared Light Communication.

4. The full-duplex communication system according to claim 1 wherein said first communication interface comprises:
at least one uplink transceiver element, adapted to receive data from a user device and/or any other one of said plurality of network members and transmit the data to any other one of said plurality of network members and/or said at least one gateway member, and
at least one downlink transceiver element, adapted to receive data from any other one of said plurality of network elements and/or said at least one gateway member and transmit the data to said user device and/or any other one of said plurality of network members.

5. The full-duplex communication system according to claim 4, wherein said uplink transceiver element is adapted to utilise Infrared Light Communication.

6. A The full-duplex communication system according to claim 4, wherein said downlink transceiver element is adapted to utilise Visible Light Communication (VLC).

7. A The full-duplex communication system according to claim 1, wherein any one of said plurality of network members further comprises a Li-Fi user access port operably coupled to said first communication interface and adapted to establish a Li-Fi communication channel with said at least one portable access member.

8. The full-duplex communication system according to claim 7, wherein said Li-Fi user access port is at least one light source.

9. The full-duplex communication system according to claim 8, wherein said at least one light source comprises at least one LED.

10. The full-duplex communication system according to claim 7, wherein said Li-Fi communication channel is established after at least one physical address is allocated to at least one of said plurality of network members.

11. The full-duplex communication system according to claim 1, wherein said optical wireless communication (OWC) is adapted to provide optical communication via electromagnetic radiation (EMR) with a wavelength in any one of the visible light spectrum, the infrared light spectrum or ultraviolet light spectrum.

12. The full-duplex communication system according to claim 1, wherein at least a predetermined portion of said plurality of network members further comprises a fourth communication interface adapted to communicatively couple to any other one of said predetermined portion of said plurality of network members via Wireless Local Area Network (WLAN) communication and/or Local Area Network (LAN) communication.

13. The full-duplex communication system according to claim 12, wherein said Wireless Local Area network (WLAN) is adapted to provide wireless communication via electromagnetic radiation (EMR) with a wavelength in the radio frequency spectrum.

* * * * *